US012155162B2

(12) United States Patent
Buechling et al.

(10) Patent No.: US 12,155,162 B2
(45) Date of Patent: Nov. 26, 2024

(54) BUS BAR CONTACT FOR ATTACHMENT TO A BUS BAR, AND METHOD FOR ATTACHING A BUS BAR CONTACT

(71) Applicant: TE Connectivity Germany GmbH, Bensheim (DE)

(72) Inventors: Chris Buechling, Bensheim (DE); Frank Kaehny, Bensheim (DE); Manuel Eheim, Bensheim (DE); Marcus Wolf, Manheim (DE); Bjoern Hoffmann, Bensheim (DE); Alexander Weber, Bensheim (DE); Patrick Distler, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/554,561

(22) Filed: Dec. 17, 2021

(65) Prior Publication Data

US 2022/0200220 A1     Jun. 23, 2022

(51) Int. Cl.
*H01R 4/30* (2006.01)
*H01R 13/627* (2006.01)
*H01R 25/16* (2006.01)

(52) U.S. Cl.
CPC ............ *H01R 25/161* (2013.01); *H01R 4/30* (2013.01); *H01R 13/627* (2013.01)

(58) Field of Classification Search
CPC ...... H01R 25/161; H01R 25/162; H01R 4/30; H01R 13/627; H01R 13/6277
See application file for complete search history.

(56) References Cited

U.S. PATENT DOCUMENTS

| | | | |
|---|---|---|---|
| 4,570,338 A * | 2/1986 | Ignatowicz | H01R 12/53 439/876 |
| 4,939,406 A | 7/1990 | Jeschonneck et al. | |
| 5,295,851 A | 3/1994 | Bawa et al. | |
| 5,439,398 A * | 8/1995 | Testa | H01R 4/38 411/237 |
| 5,487,685 A * | 1/1996 | Stillback | F16B 37/061 439/883 |
| 6,257,939 B1 | 7/2001 | Courtois et al. | |
| 6,345,438 B1 | 2/2002 | Zahnen et al. | |
| 6,491,487 B1 * | 12/2002 | Wojciechowski | F16B 37/068 403/278 |
| 7,425,144 B2 * | 9/2008 | Bader | H01R 9/18 361/624 |

(Continued)

FOREIGN PATENT DOCUMENTS

| | | |
|---|---|---|
| CH | 555 601 A | 10/1974 |
| CN | 202111243 U | 1/2012 |

(Continued)

OTHER PUBLICATIONS

German Office Action, App No. 10 2020 134 255.1, dated Aug. 23, 2021, 4 pages.

(Continued)

*Primary Examiner* — Vanessa Girardi
(74) *Attorney, Agent, or Firm* — Barley Snyder

(57) ABSTRACT

A busbar contact includes a contact ring and a fastening element. The contact ring has a contact surface at a distal end and a press-in flange projecting radially. The press-in flange has a cylindrical contact surface pointing radially outward.

15 Claims, 9 Drawing Sheets

(56) References Cited

U.S. PATENT DOCUMENTS

| | | | |
|---|---|---|---|
| 9,520,658 B1 * | 12/2016 | Schmit | H01R 4/302 |
| 10,381,752 B2 | 8/2019 | Kaehny et al. | |
| 10,756,451 B2 | 8/2020 | Wagner et al. | |
| 10,886,641 B2 | 1/2021 | Kneissl | |
| 2011/0003519 A1 | 1/2011 | Oka et al. | |
| 2013/0130563 A1 | 5/2013 | Giraud et al. | |
| 2014/0349527 A1 | 11/2014 | Himeno et al. | |
| 2016/0156111 A1 | 6/2016 | Forsyth | |
| 2017/0054227 A1 | 2/2017 | Cumant | |

FOREIGN PATENT DOCUMENTS

| | | |
|---|---|---|
| CN | 103080571 A | 5/2013 |
| CN | 109690873 A | 4/2019 |
| DE | 336468 C | 5/1921 |
| DE | 10 2013 013 368 A1 | 2/2015 |
| DE | 10 2014 002 820 B3 | 8/2015 |
| DE | 102016218779 A1 | 3/2018 |
| DE | 10 2017 210 425 A1 | 12/2018 |
| DE | 10 2016 206 378 A1 | 8/2020 |
| EP | 0880199 A1 | 11/1998 |
| EP | 3136511 A2 | 3/2017 |
| ES | 2002793 A6 | 10/1988 |
| FR | 2716243 A1 | 8/1995 |
| FR | 2978306 A1 | 1/2013 |
| GB | 2344627 A | 6/2000 |
| JP | S5392810 U | 7/1978 |
| KR | 20090060791 A | 6/2009 |
| WO | 2018 050 344 A1 | 3/2018 |

OTHER PUBLICATIONS

Extended European Search Report, Application No. 21216107.9-1201, dated Aug. 19, 2022, 18 pages.
Office Action from Japan's Patent Office dated Dec. 2, 2022, corresponding to Application No. 2021-202994 with English translation, 4 pages.
Extended European Search Report dated Jul. 28, 2023, corresponding to Application No. 23170942.9-1201, 19 pages.
Chinese First Office Action dated Aug. 1, 2023 with English translation, corresponding to Application No. 202111534589.X, 19 pages.

* cited by examiner

BUS BAR CONTACT FOR ATTACHMENT TO A BUS BAR, AND METHOD FOR ATTACHING A BUS BAR CONTACT

CROSS-REFERENCE TO RELATED APPLICATIONS

This application claims the benefit of the filing date under 35 U.S.C. § 119(a)-(d) of German Patent Application No. 102020134255.1, filed on Dec. 18, 2020.

FIELD OF THE INVENTION

The present invention relates to a contact and, more particularly, to a busbar contact.

BACKGROUND

Busbars are used to transmit currents, in particular high currents, with low resistance. They can be used, for example, in electrically powered vehicles to transmit the electrical power. However, previous systems are complex to manufacture and assemble and/or may exhibit high contact resistance at connection points.

SUMMARY

A busbar contact includes a contact ring and a fastening element. The contact ring has a contact surface at a distal end and a press-in flange projecting radially. The press-in flange has a cylindrical contact surface pointing radially outward.

BRIEF DESCRIPTION OF THE DRAWINGS

The invention will now be described by way of example with reference to the accompanying Figures, of which.

DETAILED DESCRIPTION OF THE EMBODIMENT(S)

The invention shall be explained in more detail hereafter by way of example on the basis of embodiments with reference to the drawings. The advantageous further developments and configurations shown there are each independent of one another and can be combined with one another in various combinations, depending on necessity in the application.

A first embodiment of a busbar contact 100 is shown in FIGS. 1 to 6. In an embodiment, the busbar contact 100 is used to establish a secure electrical connection between a busbar 50 and a mating element. Busbar 50 can be, for example, part of an electric drive in a vehicle. In an embodiment, the busbar 50 is a conductor rail. For this purpose, it may be necessary to be able to transmit high currents and/or voltages. Busbar contact 100 is therefore to enable low contact resistance to busbar 50.

Figure 1:
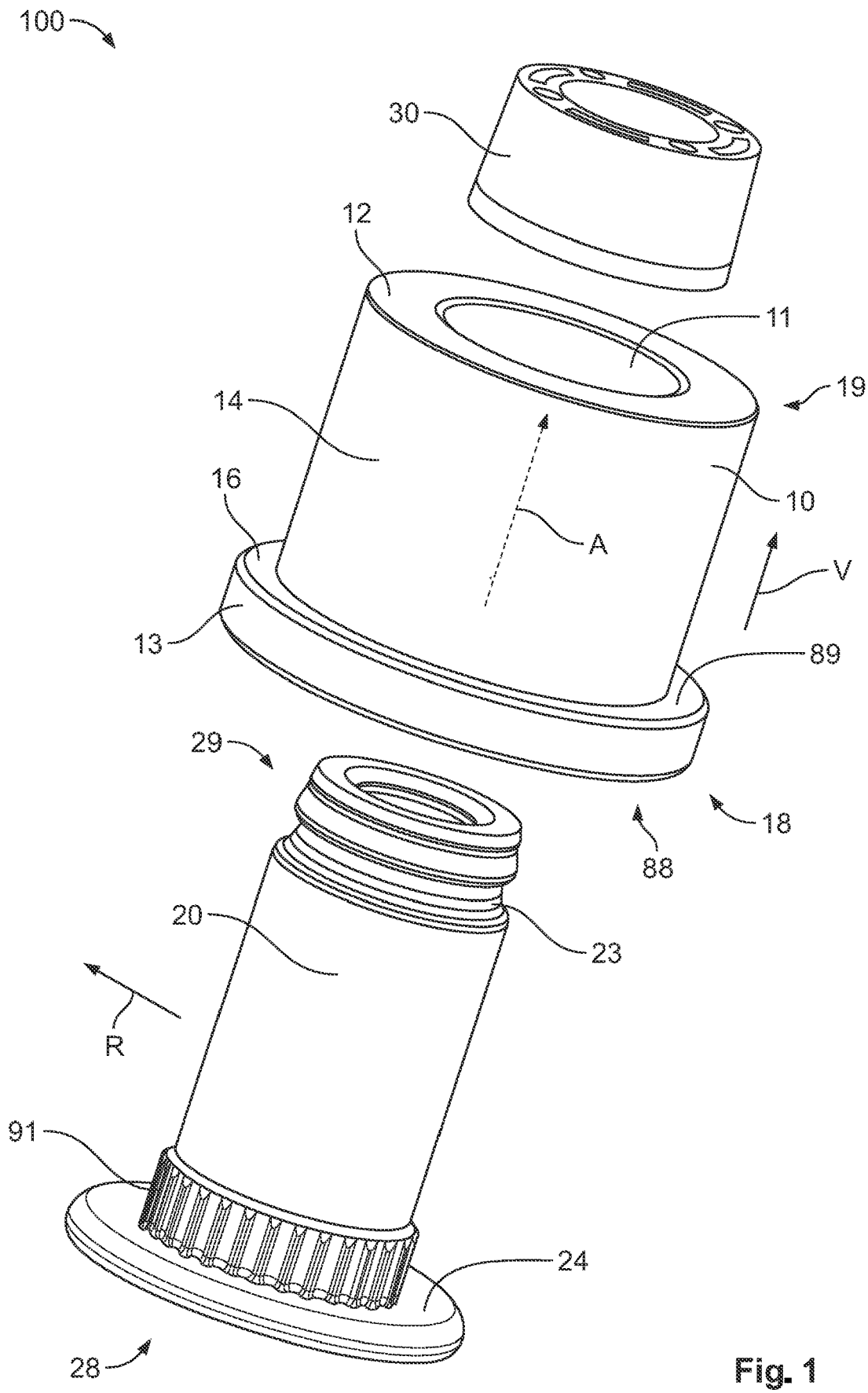
FIG. 1 is an exploded perspective view of a busbar contact according to an embodiment.

As shown in FIG. 1, the busbar contact 100 has a contact ring 10 made of material having good electrical conductivity, for example, copper, and thereby enables good conductivity. Contact ring 10 has a contact surface 12 at a distal end 19 for establishing contact with the mating element. In the example shown, contact surface 12 has the shape of a circular ring and runs perpendicular to a direction of connection V along which busbar contact 100 is connected to the mating element. Contact surface 12 disposed at a distal end 19 on a front surface of a tubular section 14 of contact ring 10.

A press-in flange 16 is present at a proximal end 18 of contact ring 10 shown in FIG. 1, which in the assembled state is associated with busbar 50. Press-in flange 16 projects radially from the remainder of contact ring 10. Press-in flange 16 therefore projects beyond tubular section 14, i.e. in a radial direction R which runs perpendicular to an axial direction A. Press-in flange 16 projects about axial direction A along the entire circumference from tubular section 14; it extends throughout along the entire circumference of contact ring 10 in the shown embodiment.

Press-in flange 16 has a cylindrical contact surface 13 pointing radially outwardly. This contact surface 13 establishes a good electrical connection to busbar 50 in the inserted or pressed-in state. Contact surface 13 is at each point perpendicular to radial direction R and parallel to axial direction A. Press-in flange 16 further comprises a front surface 89 and a rear surface 88 parallel thereto which each extend perpendicular to axial direction A and to contact surface 13, as shown in FIG. 1. Press-in flange 16 consequently has a substantially rectangular cross section when the cross-sectional plane comprises axial direction A and radial direction R. As a result, a good flow of current can be obtained while at the same time achieving high stability. Cylindrical contact surface 13 is disposed on an outer side of contact ring 10 and represents the outermost surface of contact ring 10 in radial direction R.

In the region of press-in flange 16, the outer diameter of contact ring 10 is significantly larger than that of tubular section 14. It can be, for example, 5, 10, or 20 percent larger than at the remainder of contact ring 10. In order not to let conductive tubular section 14 become too small and still be able to transmit sufficient currents, a value of 50% or 100% can be the maximum to be considered in order to still obtain sufficient stability in the mechanical fastening and sufficient ampacity.

Figure 2:
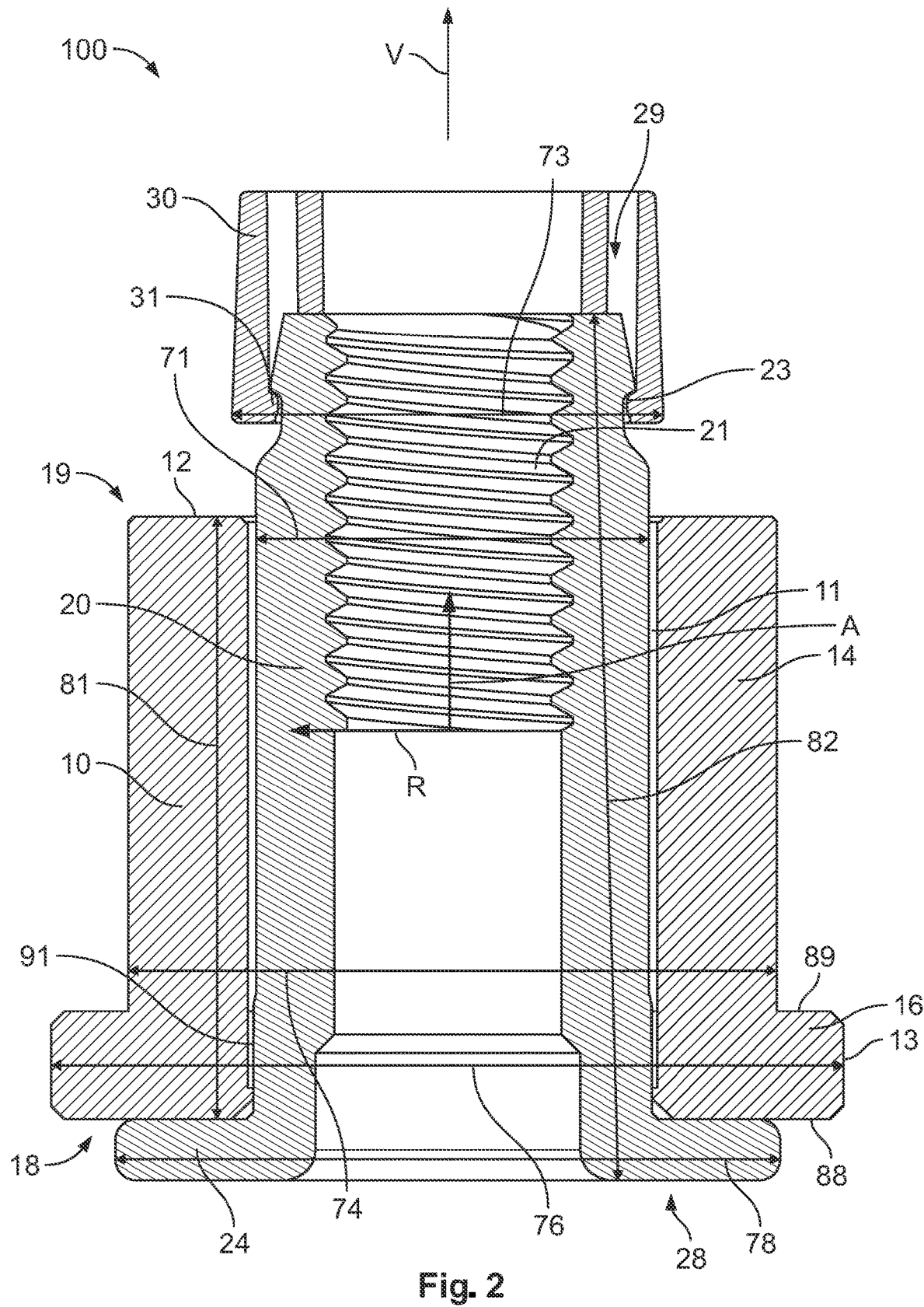
FIG. 2 is a sectional side view of the busbar contact of FIG. 1 in an assembled state.

In the embodiment shown in FIG. 2, an outer diameter 76 of press-in flange 16 is approximately 25 percent larger than an outer diameter 74 of tubular section 14. Outer diameters 74, 76 are each measured along radial direction R.

In order to be able to fasten busbar contact 100 mechanically well to the mating element, the busbar contact 100 has a fastening element 20, as shown in FIGS. 1 and 2. Fastening element 20 is made of mechanically stable material, for example, steel. Fastening element 20 is configured such that it presses contact ring 10 along direction of connection V toward the mating element. This creates a good electrically conductive connection between contact surface 12 on distal end 19 and a corresponding mating contact surface on the mating element. The mating element, for example, can likewise comprise a contact ring.

Fastening element 20 comprises a press-on flange 24 which projects radially from a proximal end 28 of fastening element 20, as shown in FIGS. 1 and 2. An outer diameter 78 of press-in flange 24 is smaller than outer diameter 76 of press-in flange 16 in order to be able to deform an edge 57 of a hole 51 in busbar 50, shown and described in greater detail below with reference to FIG. 3, such that it engages behind contact ring 10 after busbar contact 100 has been inserted into busbar 50. In the example shown, outer diameter 78 of press-in flange 24 corresponds approximately to outer diameter 74 of tubular section 14 for enabling good force transmission along axial direction A.

Press-on flange 24 and press-in flange 16 in the region in which they abut against one another in the assembled state are configured to be approximately complementary in order to allow for good force transmission. In the example shown, the respective surfaces are each planar and perpendicular to direction of connection V. The press-in flange 16 can project radially beyond the press-on flange 24. The press-in flange 16 can project further radially or laterally than the press-on flange 24. The press-in flange 16 can be wider than the press-on flange 24, i.e. can have a larger outer diameter.

In the assembled state, fastening element 20 penetrates contact ring 10. Fastening element 20 is then received in a receiving channel 11 which extends along axial direction A, as shown in FIG. 2. A length 81 of contact ring 10 measured along axial direction A corresponds to approximately 70 percent of a length 82 of fastening element 20, which is also measured in axial direction A. This results in a good mechanical connection. In other embodiments, the length 81 of the contact ring 10 can be at least 40%, at least 50%, or at least 60% of the length 82 of the fastening element 20 in order to achieve good mechanical stability. A value of 150% can be regarded as being the upper limit.

Fastening element 20 has clamping projections 91, shown in FIGS. 1 and 2, located adjacent to press-on flange 24 which serve to clamp fastening element 20 to contact ring 10 at least temporarily. Clamping projections 91 are configured as clamping strips which extend away from press-on flange 24 along direction of connection V and have a large active surface. They are distributed uniformly along a circumference on fastening element 20. In the assembled state, clamping projections 91 are disposed within press-in flange 16. As a result, the clamping force can be high without causing deformation. The clamping projection 91 can have a uniform cross section along an axial direction A so that the contact ring 10 can simply be pushed onto the fastening element 20 along the axial direction A.

In order to be able to securely fasten fastening element 20 to the mating element, the fastening element 20 has a screw thread in the form of an internal thread 21, as shown in FIG. 2. Internal thread 21 is located at a proximal end 29 of fastening element 20 and extends approximately up to midway of fastening element 20 along direction of connection V.

Busbar contact 100 also comprises a touch guard cap 30 made of an electrically insulating material, shown in FIGS. 1 and 2. A spring 31 in the form of an inwardly protruding collar on touch guard cap 30 engages in a corresponding circumferential groove 23 on distal end 29 of fastening element 20 for securing touch guard cap 30. In order to further prevent contact ring 10 from falling off fastening element 20, an outer diameter 73 of touch guard cap 30 is somewhat larger than an inner diameter, i.e. an inner clear width 71 of receiving channel 11 of contact ring 10.

Various steps of a method are shown in FIGS. 2, 3, 4 and 5.

Figure 3:
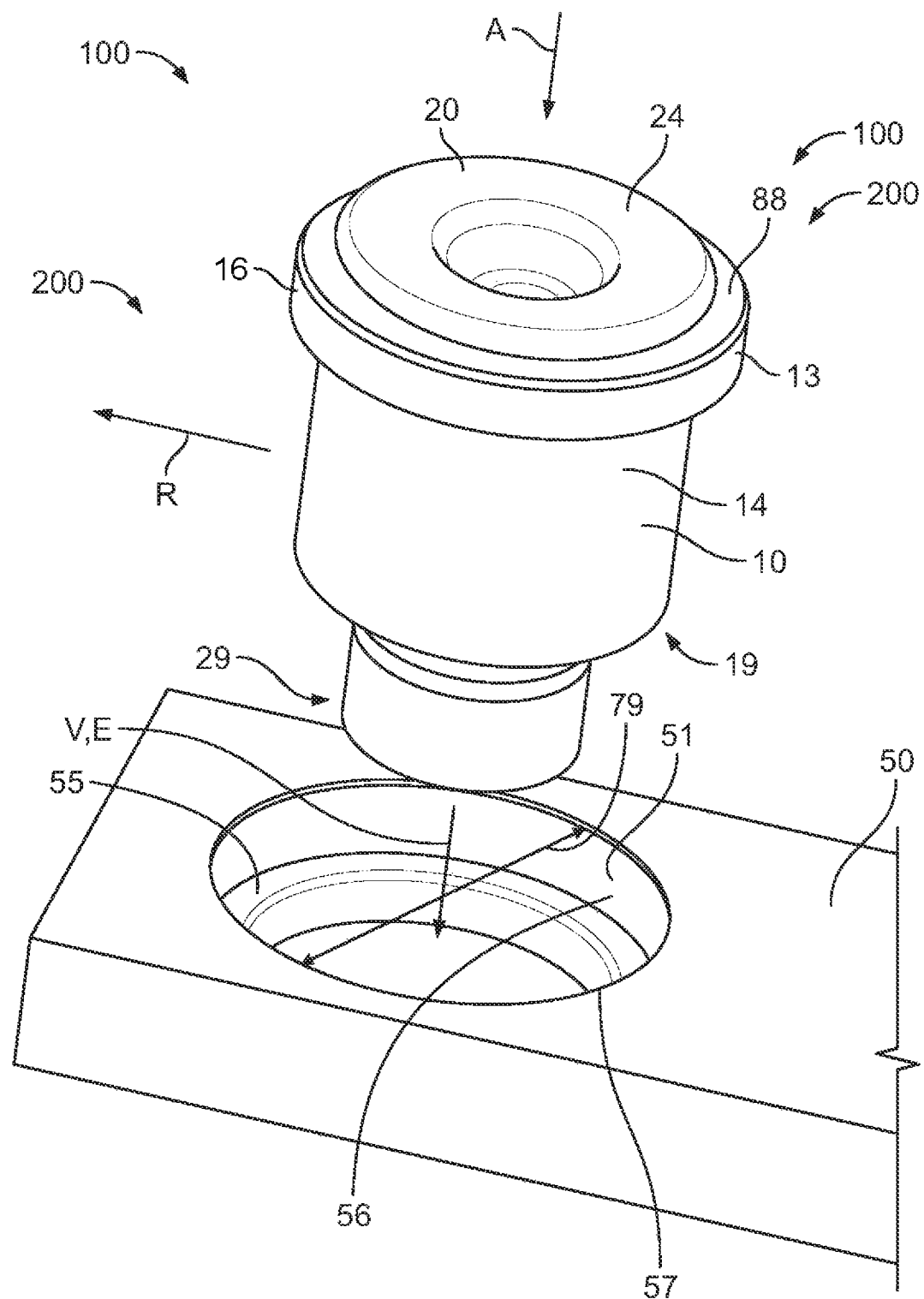
FIG. 3 is a perspective view of the busbar contact of FIG. 1 being inserted into a busbar.

Once fastening element 20 has been inserted into contact ring 10 and touch protection cap 30 has optionally been attached, as shown in FIG. 2, the busbar contact 100 thus established is inserted along a direction of insertion E into a hole 51 in busbar 50, as shown in FIG. 3. Direction of insertion E there runs parallel to direction of connection V, along which busbar contact 100 is later connected to the mating element. Press-in flange 16 is there pressed into hole 51 which, at least in the upper section, has a diameter which corresponds approximately to outer diameter 76 or is slightly smaller. Pressing in establishes a good mechanical and electrical contact, in particular in the region of contact surface 13, which in the assembled state abuts against a mating pressing surface 56 in the hole.

Figure 4:
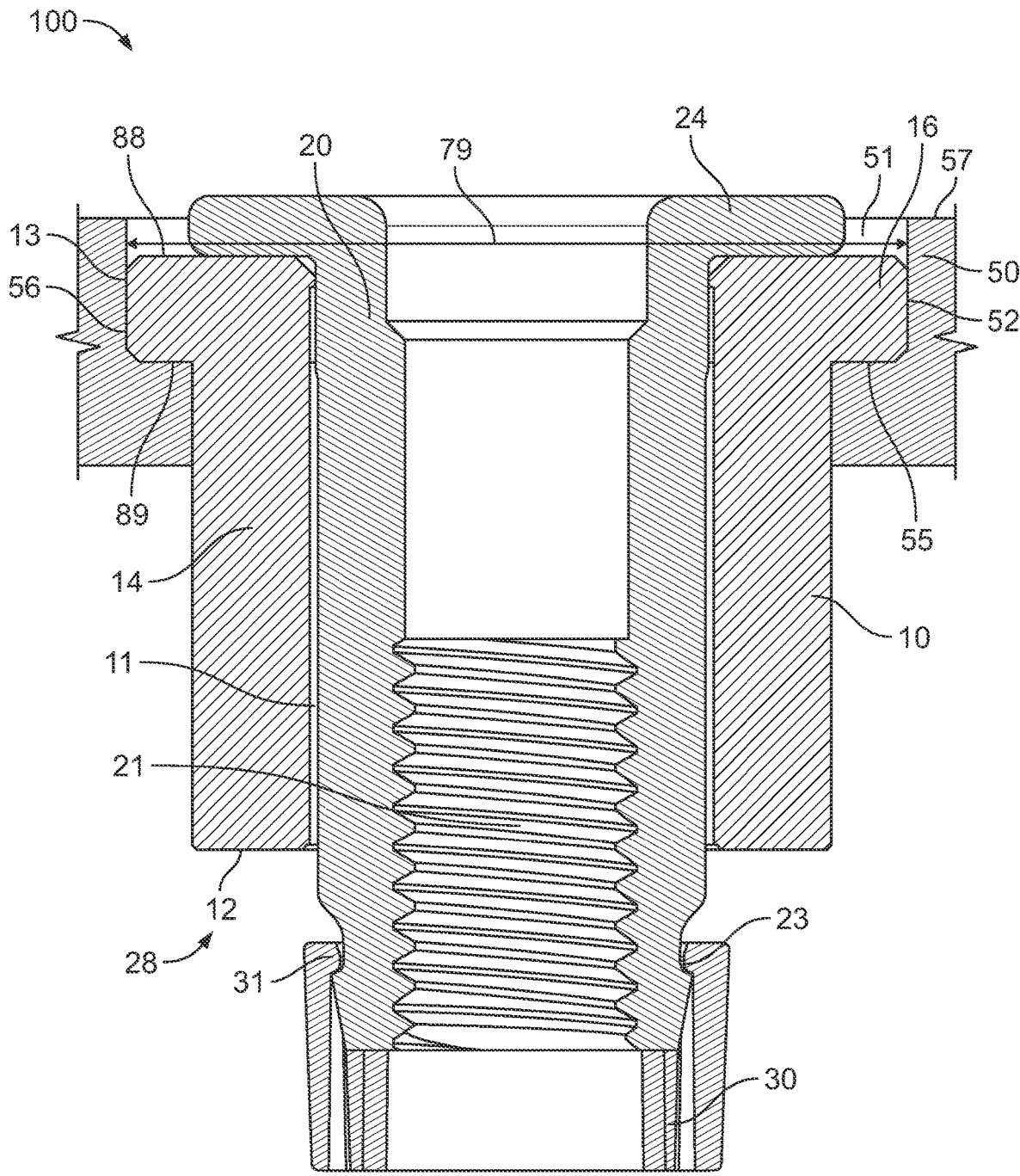
FIG. 4 is a sectional side view of the busbar contact of FIG. 1 inserted into the busbar.
Figure 5:
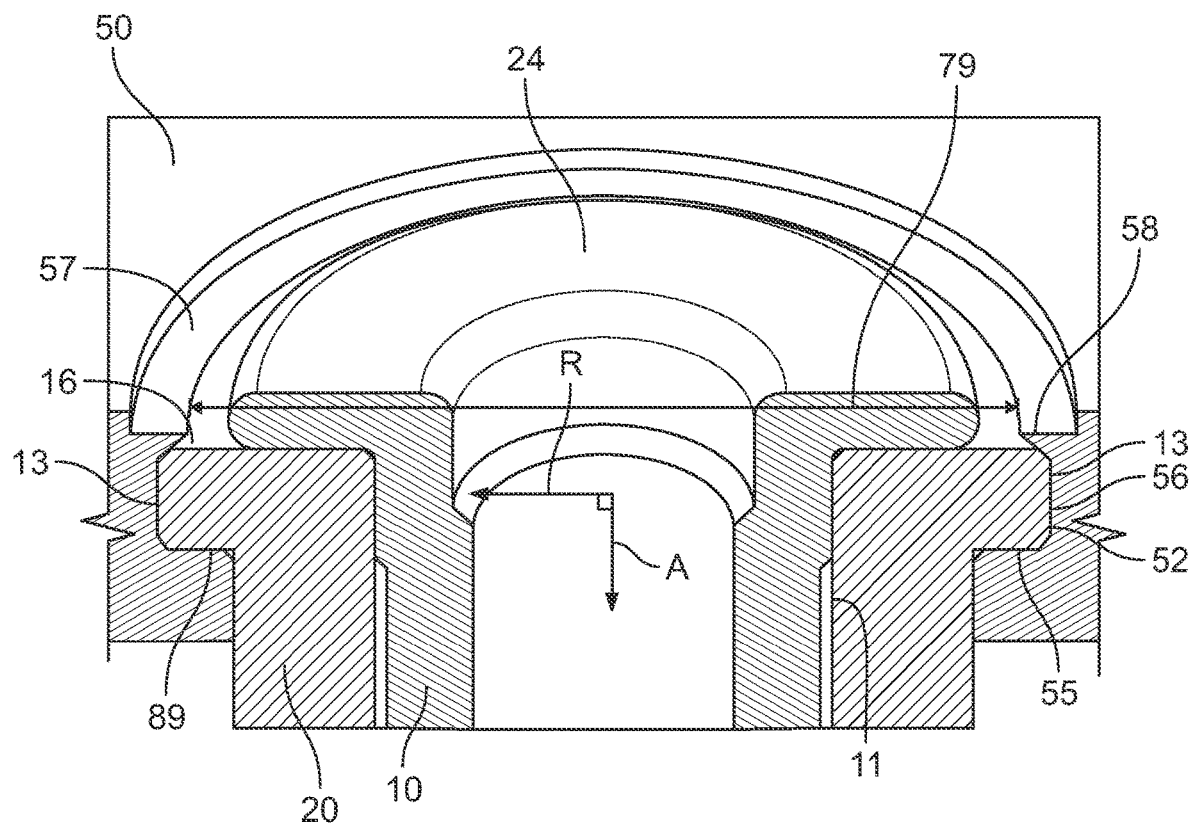
FIG. 5 is a sectional perspective view of the busbar contact of FIG. 1 inserted into the busbar, with an edge of a hole of the busbar deformed.

In the example shown in FIGS. 3, 4 and 5, hole 51 in busbar 50 is a stepped hole 52 which has two different inner diameters along direction of insertion E. This causes automatic positioning of busbar contact 100, since it can only be inserted until it strikes a stepped surface 55. In this position, rear surface 88 is automatically correctly positioned. An edge 57 of hole 51 can then be deformed onto rear surface 88 such that a bead 58 thus formed engages behind and thereby secures contact ring 10 in the region of press-in flange 16, as shown in FIG. 5. Edge 57 can be reshaped or deformed, for example, by peening with a tool. As a result of the deformation, an inner diameter of hole 51 is reduced at least in the region of edge 57. In particular, an opening diameter of hole 57 is reduced by the deformation. This allows the contact ring 10 to be secured and the contact force to be increased. In an embodiment, the hole 51 can be cylindrical in sections. The hole 51 can be created by drilling. With such deformation, ultrasound can also be used for improvement. A tool in such a device can abut against the edge of the hole 51 during the plastic deformation step. A tool can be configured, for example, as a ram or a pin. In an embodiment, the edge 57 can be pressed in throughout, e.g. along 360 degrees around the hole 51.

Figure 6:
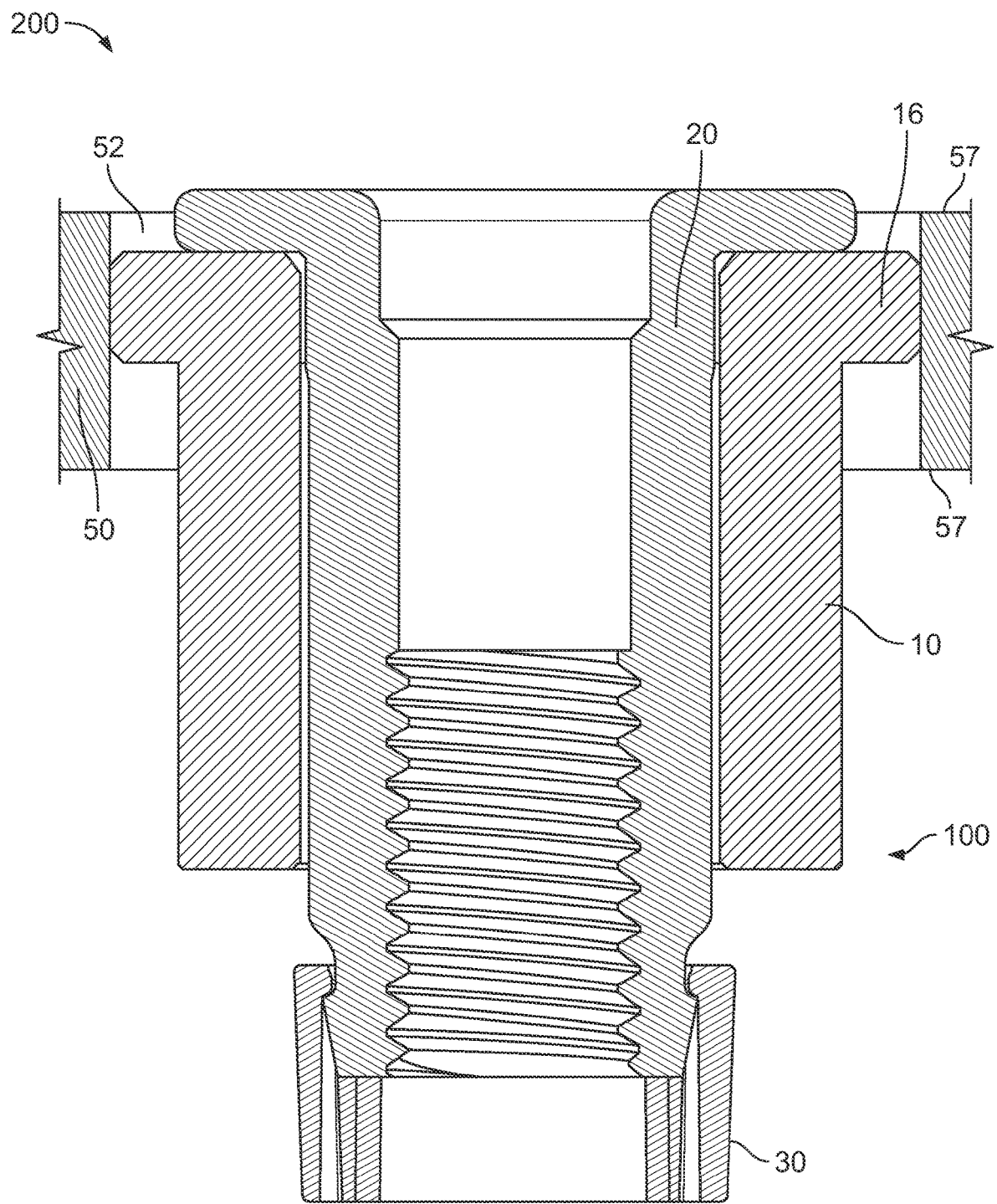
FIG. 6 is a sectional side view of the busbar contact of FIG. 1 inserted into a busbar according to another embodiment.

FIG. 6 shows a further configuration of an assembly 200 comprising a busbar contact 100 and a busbar 50. Busbar contact 100 in this example corresponds to that from FIGS. 1 to 5. Busbar 50, however, is configured differently. Instead of a stepped hole 52, a hole 51 with a uniform inner diameter is provided there. In such a configuration, the busbar contact 100 can be temporarily held in the correct position, for example, by an operator or a machine or by frictional engagement in the hole 51. In such a configuration, edges 57 on both sides of hole 51 are deformed after busbar contact 100 has been pressed in or inserted. Busbar contact 100 is thereby held on both sides by a respective bead 58. Such a design can be easier to manufacture.

One advantage of the configuration according to FIGS. 1 to 6 can be seen in particular in the fact that contact surface 13, through which a large portion of the current flows, is disposed outside a force flow for the mechanical fastening. As a result, the electrical connection between contact ring 10 and busbar 50 on contact surface 13 is largely independent of the connecting force between fastening element 20 and the mating element. Due to the cylindrical contact surface 13 pointing radially outwardly and the non-stepped contact ring 10 diameter, which are both configured exactly to the busbar 50, a radial current flow can take place with a good cross section and large contact force and therefore low resistance.

Figure 7:
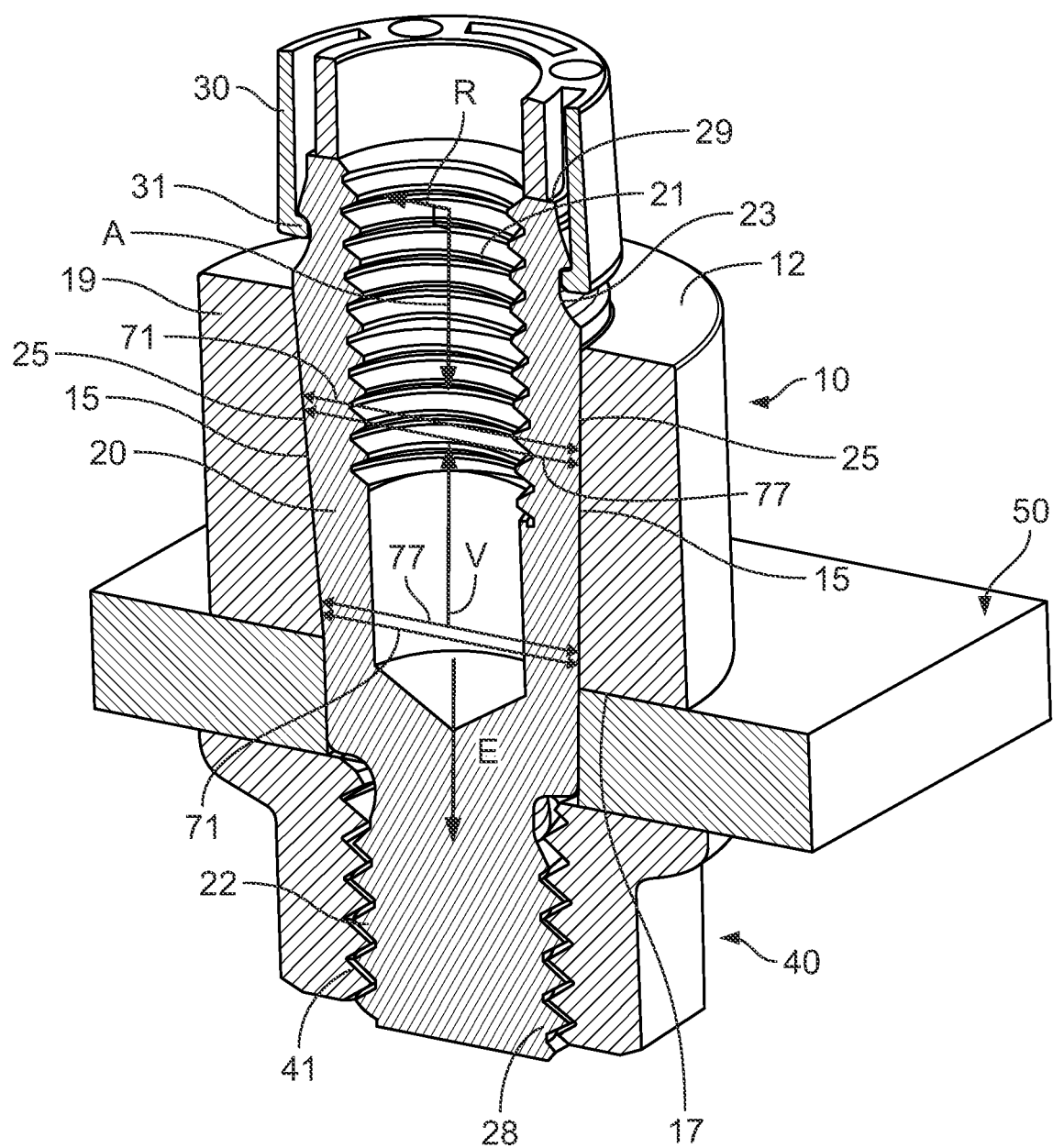
FIG. 7 is a sectional perspective view of a busbar contact according to another embodiment mounted on a busbar.
Figure 8:
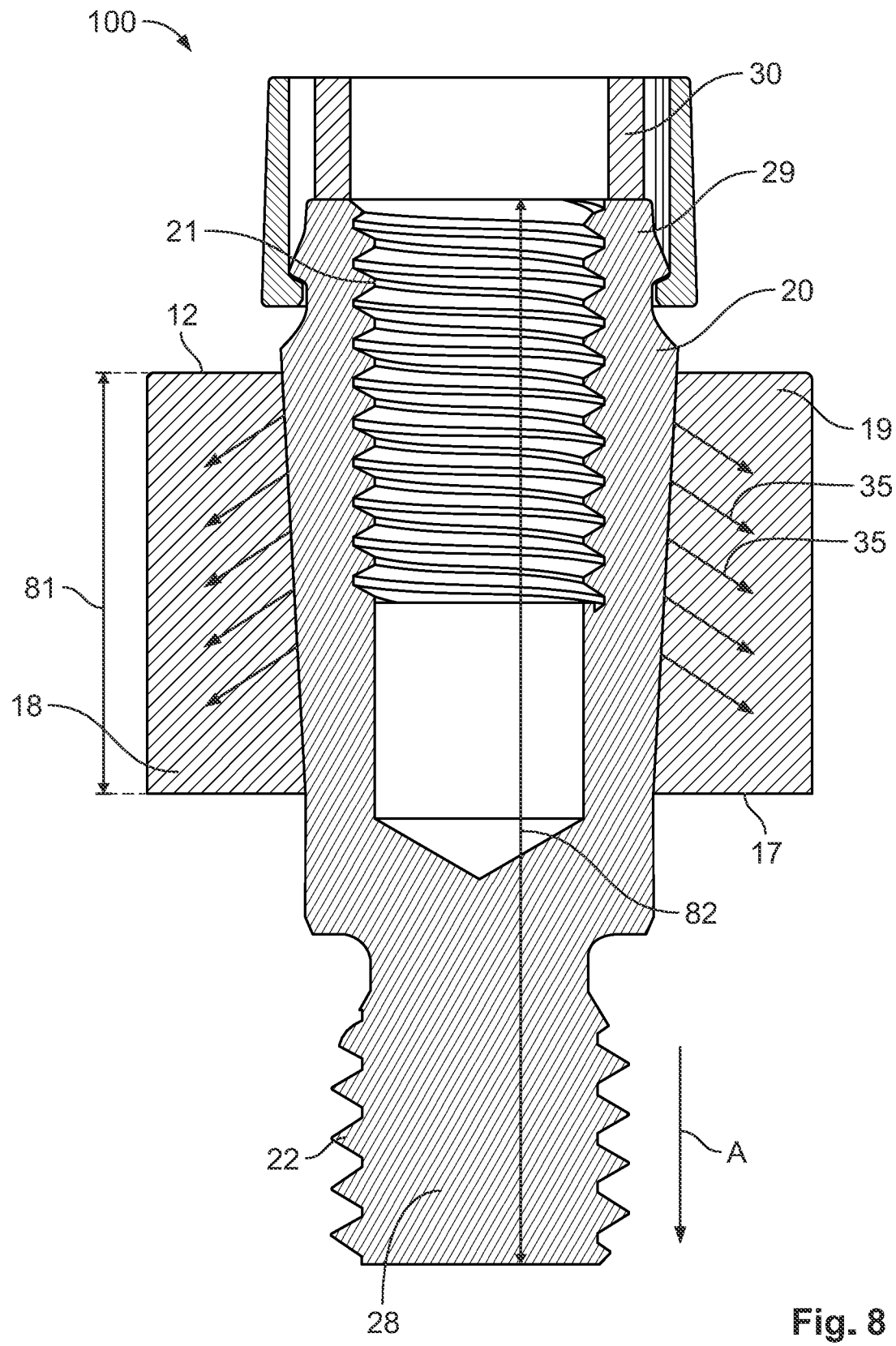
FIG. 8 is a sectional side view of the busbar contact of FIG. 7.
Figure 9:
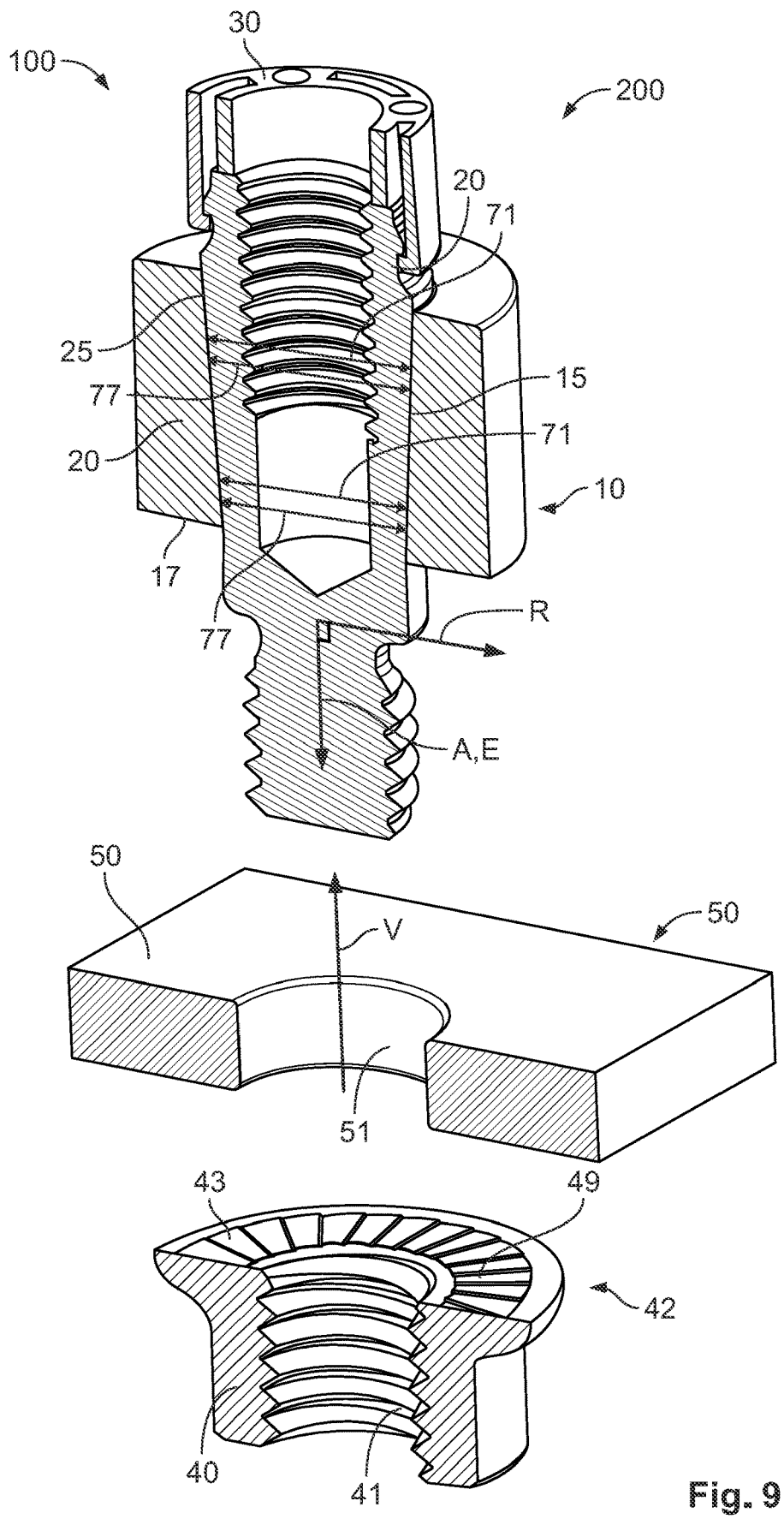
FIG. 9 is a sectional perspective view of the busbar contact of FIG. 7 being inserted into the busbar.

A further embodiment of a busbar contact 100 is shown in FIGS. 7 to 9. In many parts it corresponds to the embodiment of FIGS. 1 to 6. The following therefore mainly pertains to the differences.

Busbar contact 100 again comprises a contact ring 10 which comprises a contact surface 12 at a distal end 19 for contacting a mating element. Contact ring 10 is again made of material with good electrical conductivity, for example, copper, and in the assembled state is in electrical contact with busbar 50 on a rear contact surface 17. No connection in a positive substance-fit manner needs to be present at the connection point, as would be created, for example, by soldering or welding.

For mechanical fastening to the mating element, busbar contact 100 again comprises a fastening element 20 made of mechanically stable material, such as steel. Fastening element 20 extends in a receiving channel 11 through contact ring 12 and through hole 51 in busbar 50. To secure busbar contact 100 to busbar 50, a counter element 40 is provided on the other side of busbar 50 and with its internal thread 41 engages in an external thread 22 of fastening element 20, as shown in FIG. 7. Other fastening mechanisms are also possible, for example, in the manner of a bayonet or by way of a catch connection.

By rotating counter element 40 relative to fastening element 20, fastening element 20 can be drawn toward counter element 40. Due to conical contact surfaces 15, 25 on contact ring 10 or on fastening element 20, respectively, good mechanical contact between contact ring 10 and fastening element 20 is established automatically having a large contact force 35 shown in FIG. 8 and a sufficiently low surface pressure not to deform contact ring 10. Furthermore, contact ring 10 is automatically pressed against busbar 50 so that a large contact force also acts in the region of rear contact surface 17. For this purpose, the conical press-on surfaces 15, 25 may have as large a surface as possible and can extend along the entire length of the contact ring 10.

Contact surfaces 15, 25 extend over approximately 50 percent of length 82 of fastening element 20 and over entire length 81 of contact ring 10, where length 81, 82 are each measured along direction of connection V, as shown in FIG. 8. In the region of contact surfaces 25, fastening element 20 tapers in a direction opposite to direction of connection V, i.e. from a distal end 28 to a proximal end 29. An outer diameter 77 of fastening element 20 and an inner clear width 71 of receiving channel 11 reduce in a direction opposite to direction of connection V, as shown in FIG. 7.

Press-on surfaces 15 of contact ring 10 are complementary to press-on surfaces 25 of fastening element 25, tapering in a direction opposite to the direction of connection V. Such a configuration enables an automatic pressing operation and thereby a large contact force. As a result, the resistance is low there as well. In particular, an opening angle of the cone of press-on surfaces 15, 25 is equal so that they can lie on one another in a planar manner.

A step of a method is shown in FIG. 9. Once fastening element 20 has been inserted into the contact ring 10, it is inserted into busbar 50 in the step shown along a direction of insertion E which in this case runs in a direction opposite to direction of connection V. A part of fastening element 20 is inserted through hole 51 and thereafter protrudes on the other side of busbar 50. There it is connected to counter element 40 by a screwing motion. As a result, busbar 50 is clamped between counter element 40 and contact ring 10. It is held securely in this way.

In order to prevent counter element 40 from rotating relative to busbar 50, there is a radially projecting flange 42 present on counter element 40, on front side 49 of which toothed elements 43 project in the direction toward busbar 50. In the embodiment shown in FIG. 9, a plurality of toothed elements 43 are present and distributed uniformly along the circumference. Toothed elements 43 can also act only along a direction of rotation, for example, a direction opposite to the direction of rotation with which fastening element 20 and counter element 40 are fastened to one another. This can prevent the connection from disengaging or can make this more difficult. This can be done, for example, by way of ramp-shaped or wedge-shaped toothed elements 43.

Busbar contact 100 again comprises a touch guard cap 30 which is secured by a tongue 31 which engages in a groove 23 on distal end 29 of fastening element 20, as shown in FIG. 7. Touch guard cap 30 again prevents a user from accessing live parts.

Assembly 200 can furthermore comprise further touch guard elements which are arranged, for example, around contact ring 10 and/or around busbar 50, for example, as an end-to-end covering made of electrically insulating material.

Unlike in the embodiment from FIGS. 1 to 6, fastening element 20 comprises an external thread 22 at its proximal end 28 in order to be able to keep hole 51 in busbar 50 as small as possible.

The busbar contact 100 according to the embodiments described above enables simple manufacture and good current transmission.

What is claimed is:

1. A busbar contact, comprising:
a contact ring having a contact surface at a distal end;
a fastening element, the fastening element and the contact ring have complementary press-on surfaces that taper in a direction opposite to a direction of connection between the contact ring and the fastening element, the press-on surface of the contact ring is an inner surface of the contact ring and the press-on surface of the fastening element is an outer surface of the fastening element; and
a counter element connecting to the fastening element, the counter element and the contact ring abut opposite sides of a busbar and the fastening element directly contacts the busbar.

2. The busbar contact of claim 1, wherein the counter element has a radially projecting flange with a plurality of toothed element projecting from a front side of the radially projecting flange.

3. The busbar contact of claim 1, wherein the fastening element has a screw thread.

4. The busbar contact of claim 1, wherein the contact ring has a receiving channel receiving the fastening element.

5. The busbar contact of claim 1, further comprising a touch guard cap attached to a distal end of the fastening element.

6. An assembly, comprising:
a busbar having a hole; and
a busbar contact fitted in the hole, the busbar contact including a contact ring having a contact surface at a distal end and a press-in flange projecting radially from the contact ring, the press-in flange having a cylindrical contact surface pointing radially outward, the cylindrical contact surface abuts against a mating pressing surface in the hole of the busbar, an edge of the hole is deformed to form a bead from a portion of the busbar that engages the press-in flange and secures the contact ring in the hole, the bead is formed from only the busbar; wherein the busbar contact has a fastening element received in the contact ring.

7. The assembly of claim 6, wherein the hole has a stepped bore.

8. The assembly of claim 6, wherein the press-in flange has a rectangular radial cross section.

9. The assembly of claim 6, wherein the busbar contact has a fastening element with a screw thread that is an internal thread.

10. The assembly of claim 9, wherein the fastening element has a press-on flange directly contacting the press-in flange and pressing the contact ring.

11. The assembly of claim 10, wherein the press-in flange is wider than the press-on flange.

12. The assembly of claim 9, wherein the fastening element has a clamping projection clamping to the contact ring.

13. The assembly of claim 9, wherein the contact ring has a receiving channel receiving the fastening element.

14. The assembly of claim 9, further comprising a touch guard cap attached to a distal end of the fastening element.

15. A method for fastening a busbar contact to a busbar, comprising:
   providing the busbar contact including a contact ring having a contact surface at a distal end and a press-in flange projecting radially from the contact ring, the press-in flange having a cylindrical contact surface pointing radially outward; and
   positioning the press-in flange in a hole of the busbar; and
   reducing a size of an edge of the hole by deformation to form a bead from a portion of the busbar that engages behind the press-in flange and secures the contact ring in the hole, the bead is formed from only the busbar; wherein
   the busbar contact has a fastening element inserted into the contact ring and through the hole of the busbar.

* * * * *